United States Patent [19]

White

[11] 4,328,496
[45] May 4, 1982

[54] DELAY CONTROL FOR A PULSE REPEAT-BACK JAMMING SYSTEM

[75] Inventor: Charles F. White, Oxon Hill, Md.

[73] Assignee: The United States of America as represented by the Secretary of the Navy, Washington, D.C.

[21] Appl. No.: 757,644

[22] Filed: Aug. 27, 1958

[51] Int. Cl.³ ............................................... G01S 7/38
[52] U.S. Cl. .................................................... 343/18 E
[58] Field of Search ..................................... 343/18 E

[56] References Cited

U.S. PATENT DOCUMENTS

| | | | |
|---|---|---|---|
| 2,989,744 | 6/1961 | Pettit | 343/18 E |
| 3,113,268 | 12/1963 | Horak | 343/18 E X |
| 3,624,652 | 11/1971 | Haeff | 343/18 E |
| 3,760,417 | 9/1973 | Haeff et al. | 343/18 E |
| 3,983,482 | 9/1976 | Doherty | 343/18 E X |

*Primary Examiner*—T. H. Tubbesing
*Attorney, Agent, or Firm*—Robert F. Beers; William T. Ellis

EXEMPLARY CLAIM

1. In a repeat-back jammer of the type used to deceive range tracking radar systems, wherein tracking is accomplished by a gate at the input of said radar system and a servo system which adjusts the relative time position of the input gate to coincide with echo pulses returning from a distant target, and wherein said jammer includes a repeat-back amplifier which transmits a jamming pulse for each said echo pulse the initial jamming pulse being so delayed with respect to said echo pulse that only a minor portion of said jamming pulse coincides with said input gate, said jamming pulse being of sufficient amplitude that said minor portion obscures the echo pulse, the improvement which comprises; time delay means to increase said initial delay of said jamming pulse with respect to said echo pulse in response to a control signal, wave generating means to supply a control signal for said time delay means and a multiplier means for multiplying said signal by $1-\mu_o\beta_o$ interconnecting said time delay means and said wave generating means, wherein $\mu_o\beta_o$ is the open loop transfer function of said servo system.

3 Claims, 5 Drawing Figures

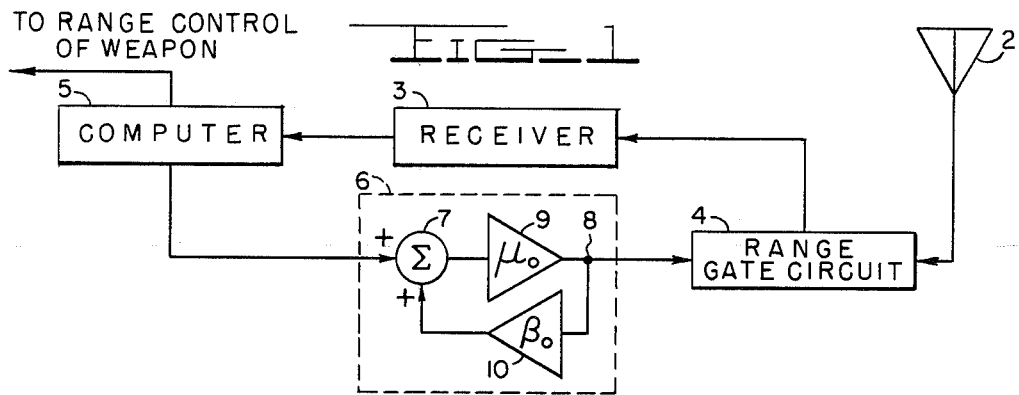
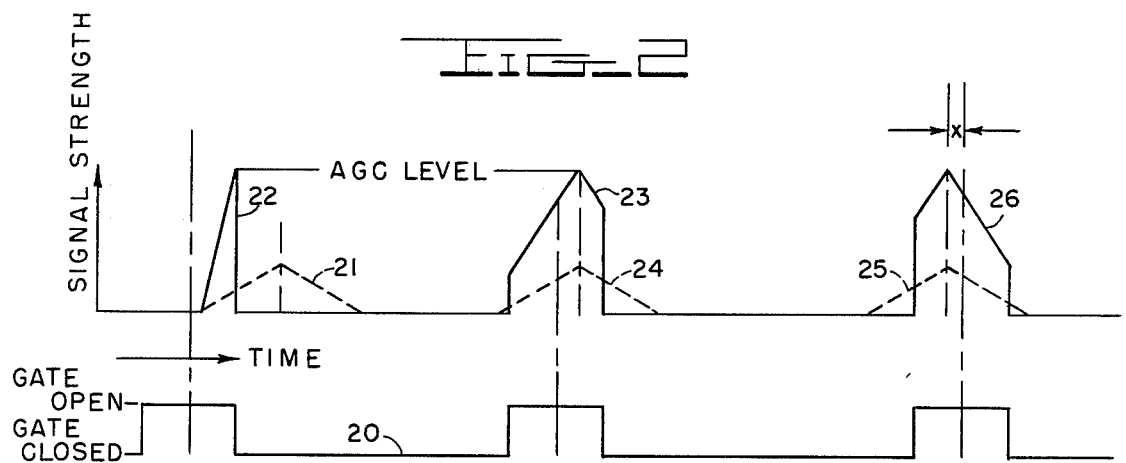
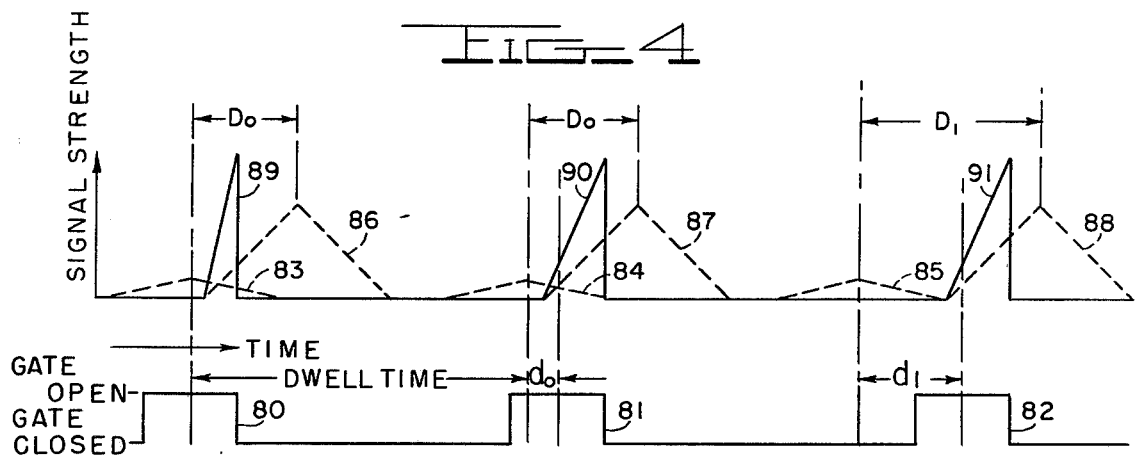

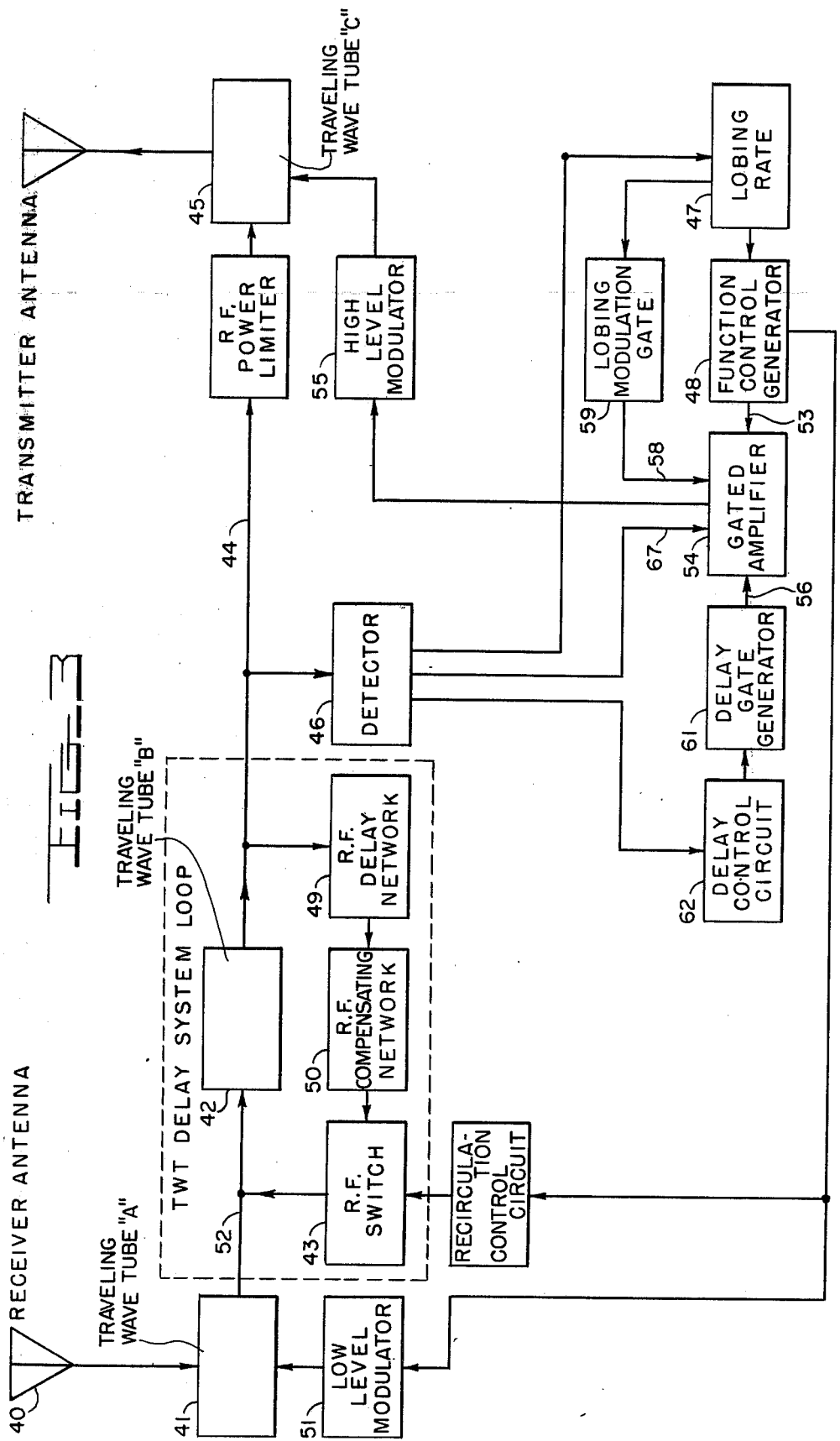

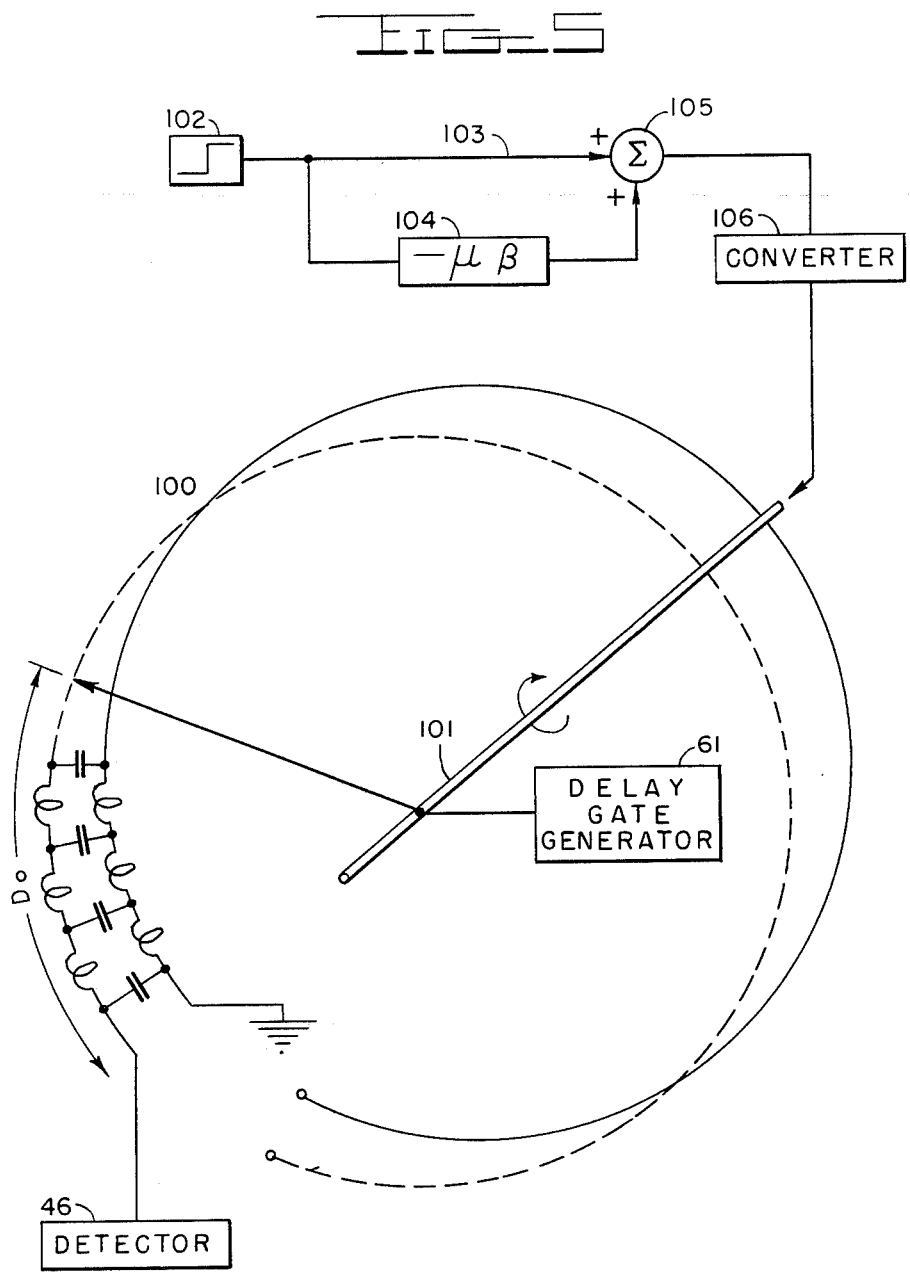

DELAY CONTROL FOR A PULSE REPEAT-BACK JAMMING SYSTEM

The invention described herein may be manufactured and used by or for the Government of the United States of America for governmental purposes without the payment of any royalties thereon or therefor.

The present invention relates to variable delay structure for use in combination with a pulse repeat-back jammer.

It has been established that a range tracking radar system can be jammed by transmitting a similar jamming pulse for each pulse received from the system, provided the jamming pulse is much stronger and somewhat delayed with respect to the echo pulse from the target. Furthermore, by increasing the delay of the jamming pulse, which constitutes a false target, the range track system can be made to follow the false target until the true target is lost. If the range tracking system is part of a fire control system, the weapon controlled either does not fire or fires at the false target.

In the present equipment for accomplishing this jamming an initial delay is provided for a fixed period, after which the operator selects the rate of change of the delay variation. If the delay is changed too slowly the weapon will not miss the target completely. This is particularly true of tracking systems with high speed computers which can determine the course of a target in seconds. If, on the other hand, the rate of increase of delay is too rapid, the tracking system will not be able to track the false target created by the jamming pulse and will track the echo pulse or true target instead. There is, therefore, a need for an adjustable automatic control for increasing the repeat-back pulse delay which can operate neither too slow nor too fast.

The present invention is directed to a delay controller for a repeat-back jammer which will operate at an optimum rate. The controller is constructed from elements designed to have substantially the same response characteristics as the servo system which controls the range gate of a typical tracking system. This insures that the tracking system will not be overdriven. This typical system is chosen on the basis that it has only the minimum requirements necessary to track the target. Thus the only system which would be overdriven by the controller is one which is incapable of tracking the target in the first place.

The invention is best understood with reference to the accompanying drawings in which:

FIG. 1 shows a portion of a typical radar range tracking apparatus;

FIG. 2 is a graph showing the relative time positions of the range gate in FIG. 1 and received echo pulses during a normal tracking period;

FIG. 3 shows the block diagram of a repeat-back jammer for the apparatus of FIG. 1;

FIG. 4 is a graph of the relative time position of the range gate in FIG. 1 as compared to that of the echo and jamming pulses during a jamming period; and FIG. 5 shows the Delay Control Circuit of FIG. 1 constructed according to the teachings of the present invention.

Referring to FIG. 1 there is shown a portion of a typical range tracking system. Echo pulses are picked up by the antenna 2 and applied to the receiver 3 through the gating circuit 4. In the tracking phase of operation the computer 5 supplies a signal to servo system 6 so that the gating circuit is open as the echo pulse arrives. The pulse is detected by the receiver and this information is fed to the computer.

As shown in FIG. 2 the computer compares the strength of the echo signal as a function of time with the position of gate over the same period. The position of the gate is indicated by line 20. The first detected echo pulse 21 which initiates the tracking phase of operation is shown centered outside of the gate with a portion of the pulse within the gate. This portion is shown amplified to a level determined by the automatic gain control of the receiver. The amplitude of the echo pulse is obviously exaggerated for clarity. The servo system 6 is immediately energized at maximum speed to vary the time position of the gate, so as to balance the amplified portion of the gated pulse energy 22 on either side of the center of the gate period. If the servo system can respond fast enough the amplified and gated energy 23 of the next pulse 24 which arrives during the gating period will be more nearly centered in the gate. The computer at this point programs a reduction in the drive of the servo system which will limit the overshoot of the next pulse 25 to a minimum, as the amplified and gated energy 26 within the gate passes through a condition of balance.

The ability of the computer to anticipate the range of the target is directly related to its ability to balance the pulse energy within the gate over a tracking period of a number of echo pulses. In effect the computer attempts to duplicate the velocity of the target by producing an analog in the operation of the servo system. The symmetry of the energy within the gate over the tracking period is a measure of the accuracy of the analog. After obtaining a sufficiently accurate analog the computer must then anticipate the range of the target at a future time when a projectile can be placed in the target path.

FIG. 3 shows a block diagram of a modern jammer for use against range tracking systems. The tracking signal is received by antenna 40 and passes through two serially connected traveling wave tube repeater amplifiers 41 and 42 to a detector 46. The R.F. switch 43 in the feedback path of amplifier 42 is normally open, and the output path 44 contains traveling wave tube 45 which normally is biased below cutoff, so that these paths in the circuit are not complete as the first pulses arrive at the detector.

The demodulated pulse from detector 46 is applied to the lobing rate detector 47 which identifies the pulses as the tracking type and energizes the function control generator 48. The function generator then energizes the R.F. switch 43 completing the feedback path of amplifier 42 causing a succeeding pulse to circulate in the resultant loop. In addition to amplifier 42 and the switch 43 the loop contains an R.F. delay network 49 and an R.F. compensating network 50 which adjust the loop gain to unity and provide a small fixed delay over the entire frequency range of the jammer. The function generator also energizes a low level modulation circuit 51 which opens the input path 52 to the loop preventing any stray pulses from entering the jammer and also preventing the jammer from receiving its own pulses.

The function control generator also energizes one input 53 of a gated amplifier 54. This amplifier energizes the high level modulator 55 in response to three signals applied coincidently to each of its three inputs 53, 56 and 58. One of the remaining signals is obtained from the detector by a direct connection. The second is obtained from a delay gate generator 61 which is controlled by a demodulated pulse from detector 46 passing through the delay control circuit 62.

The high level modulator raises the bias on the traveling wave repeater amplifier 45 in response to a signal from the gated amplifier and initiates the output pulse from the jammer. Thus the pulse from the jammer has the same frequency as the echo pulse, but has a much greater amplitude. The pulse is also delayed an amount equal to the time required for the demodulated pulse from detector to pass the delay control circuit. The traveling wave tube "A" in block 41 may be a type 6867 amplifier, while traveling wave tubes "B" and "C" in blocks 42 and 45 may be type D-79 and X268 amplifiers respectively.

FIG. 4 shows the relative time position of the echo pulse and jamming pulse as they enter the range tracking receiver during successive input gate intervals 80, 81 and 82. The amplitude of the echo pulses 83, 84 and 85 compared with the jamming pulses 86, 87 and 88 is again so small that they must be exaggerated to be shown. The same is true of jamming pulses when compared to the amplified and gated pulse portions 89, 90 and 91. Since the AGC control of the receiver discriminates in favor of strong signals, the jamming pulse has the immediate effect of capturing the range gate when the portion of the jamming pulse within the gate is of much greater magnitude than the echo pulse. The center of the jamming pulse may be theoretically initially displaced any distance $D_o$ from the center of the gate, however, due to the large increase in total pulse power necessary to maintain sufficient power within the gate, this displacement must be chosen in terms of the most practical power supply.

The delay control circuit 62 in FIG. 3 provides a more practical method of additionally pulling off the range gate than using high power jamming pulses, per se. It has been customary to use a pulse with a small delay $D_o$, as shown in FIG. 4, of sufficient magnitude to insure capture of the range gate. Capture is indicated by the displacement $d_o$ of the gate from the center of the echo pulse 81. A short period of time of the order of not more than a second (dwell time) is alloted to insure gate capture, and then the delay control circuit increases this delay to the value $D_1$ which increases with time corresponding to a constant acceleration of the false target simulated by the jamming pulse. This causes a corresponding displacement $d_1$ of the gating pulse 82. Since there is no change in the received tracking pulses at the target as the range gate is pulled off, the above jamming procedure is repeated at random intervals to insure total loss of tracking.

FIG. 4 shows only the first and last pulse of the dwell period and one pulse during the operation of the delay control circuit. There ordinarily will be many more pulses during these periods with intermediate time position relationships.

The present invention is concerned with providing the maximum delay in the delay control circuit in the minimum possible time. Since the purpose of this delay is to cause a movement of the range gate of the radar tracking system, the optimum rate of delay is the maximum rate of travel of the range gate. The latter is a function of the servo system 6 shown in FIG. 1 which operates the gate.

This servo system is composed of an input summing point structure 7, an output 8, a forward path 9 having an input over output ratio or transfer function $\mu_o$ and a feedback path 10 having a transfer function $\beta_o$. The forward path of most range tracking systems are characterized by a high gain at very low frequencies which decreases with frequency and the feedback path usually has unity inverse gain over the usable bandwidth of the system.

The input signal to servo system 6 during a jamming period is proportional to the time delay between the time position of the jamming pulse and the time position of the gate. Owing to the feedback path an error signal is developed which determines the actual rate of response of the system. The error is equal to the input signal divided by $1 - \mu_o\beta_o$. When the jamming signal is initially delayed as much as practicable to insure capture of the range gate, the initial error signal of the servo system is at a maximum. In order to maintain the error signal at this level, however, it is necessary that the delay be multiplied by a factor equal to $1 - \mu_o\beta_o$.

This term $\mu_o\beta_o$ is called the open loop transfer function of the servo system. In testing servo systems it has been customary to open the feedback path at the summing point, insert a test signal in the system, and measure the signal produced at the open end of the feedback path, where the signal is multiplied by $\mu_o\beta_o$. It has, therefore, become customary to state the specifications of a particular system in terms of this function.

FIG. 5 shows a delay control circuit according to the present invention for use in the jammer of FIG. 3. The delay is provided by a uniform delay line 100 the effective length of which is varied by movement of the rotor 101. A driving signal for the rotor is applied from a source 102 which develops a step function output. The step function is applied directly to the rotor through path 103. The magnitude of the step function is adjusted to provide the desired initial delay $D_o$ previously discussed in FIG. 4. The step function is also applied to the rotor through path 104 containing a $-\mu\beta$ multiplier, where $\mu\beta$ is substantially equal to $\mu_o\beta_o$ and combined with the original step function by means of summing point 105. The signal through path 105 causes additional rotation of the rotor with a corresponding increase in delay. If desired, the same effect can be produced by causing a constant rotation of the rotor and tapering the delay vs. length characteristic of the line according to the function $1 - \mu\beta$.

The particular structure shown in FIG. 5 is merely for illustration and should not be interpreted as limiting the invention. The $-\mu\beta$ portion may be formed from elements which are identical to the same elements of a range tracking system, or they may be electrical or mechanical analogs. If necessary, a converter 106 may be inserted between the summing point 105 and the rotor 101 to change the signals from one type to another, e.g., electrical to mechanical. The delay line need not be circular as shown, but may have any form as long as there is some means provided to control the delay in accordance with an external signal.

The initial delay is directly proportional to the width of the range gate and the jamming to echo signal ratio. This delay may be adjusted by varying the amplitude of the step function signal in FIG. 5 or by providing adjustable delay sections at the beginning of the delay line.

Certain safety factors will facilitate the design of the delay control circuit. If the circuit is designed to jam only one specific type of tracking system, the bandwidth of the circuit should be sufficiently less than that of the tracking system to allow for normal degradation. In general the circuit should be designed by selecting, from known tracking systems, the system which has the poorest transient response (least bandwidth) and yet is capable of tracking the target, regardless of any evasive path the target may choose to follow. Normal degradation of such a tracking system will itself eliminate any threat to the target.

The chief advantage of the present system is the elimination of the dwell time period characteristic of previous systems of this type. During the dwell time period the drive of the servo system decreases so that the range gate is displaced more slowly than with the present invention during this same period. At the end of the dwell time period a constant acceleration of delay was previously introduced. Since the velocity of the gate at the end of the dwell period was obviously much less than with the present delay control circuit the degree of acceleration which could be applied without overdriving the servo system is also much less. With faster computers constantly being designed, this larger initial displacement of the gate is increasingly important.

Since various embodiments of the invention not specifically set forth herein will be readily devised by those skilled in art, it is understood that the invention is to be limited only by the scope of the following claims.

What is claimes is:

1. In a repeat-back jammer of the type used to deceive range tracking radar systems, wherein tracking is accomplished by a gate at the input of said radar system and a servo system which adjusts the relative time position of the input gate to coincide with echo pulses returning from a distant target, and wherein said jammer includes a repeat-back amplifier which transmits a jamming pulse for each said echo pulse the initial jamming pulse being so delayed with respect to said echo pulse that only a minor portion of said jamming pulse coincides with said input gate, said jamming pulse being of sufficient amplitude that said minor portion obscures the echo pulse, the improvement which comprises; time delay means to increase said initial delay of said jamming pulse with respect to said echo pulse in response to a control signal, wave generating means to supply a control signal for said time delay means and a multiplier means for multiplying said signal by $1-\mu_o\beta_o$ interconnecting said time delay means and said wave generating means, wherein $\mu_o\beta_o$ is the open loop transfer function of said servo system.

2. In a repeat-back jammer including at least one repeater amplifier having a predetermined time delay for supplying jamming pulses to the servo system of a range gate in a pulse echo range tracking apparatus, means for varying the time delay of said amplifier comprising, a delay structure having a control signal input such that the delay of said structure is proportional to the amplitude of a control signal applied to said input, a source of control signal having a step function waveform, multiplier means for multiplying said control signal by $1-\mu\beta$, where $\mu\beta$ is substantially equal to the open loop transfer function of said servo system, and means coupling said signal source to said multiplier means and said multiplier means to said control signal input, whereby said step function signal multiplied by $1-\mu\beta$ is applied to said control signal input.

3. A jamming structure according to claim 2 wherein said multiplying means includes an input and an output, a first and a second unidirectional signal path connecting said input and said output, said first path including means for multiplying the signal therein by $-\mu\beta$.

* * * * *